(12) United States Patent
Myoren et al.

(10) Patent No.: US 9,279,329 B2
(45) Date of Patent: Mar. 8, 2016

(54) TRANSONIC BLADE

(75) Inventors: Chihiro Myoren, Tokai (JP); Yasuo Takahashi, Mito (JP); Shinya Marushima, Hitachinaka (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 493 days.

(21) Appl. No.: 13/879,084

(22) PCT Filed: Oct. 18, 2010

(86) PCT No.: PCT/JP2010/006152
§ 371 (c)(1),
(2), (4) Date: May 30, 2013

(87) PCT Pub. No.: WO2012/053024
PCT Pub. Date: Apr. 26, 2012

(65) Prior Publication Data
US 2013/0259668 A1    Oct. 3, 2013

(51) Int. Cl.
*F04D 29/38* (2006.01)
*F01D 5/14* (2006.01)
*F04D 21/00* (2006.01)
*F04D 29/32* (2006.01)

(52) U.S. Cl.
CPC ............... *F01D 5/147* (2013.01); *F01D 5/141* (2013.01); *F04D 21/00* (2013.01); *F04D 29/324* (2013.01); *F04D 29/384* (2013.01);
(Continued)

(58) Field of Classification Search
CPC ....... F01D 5/141; F01D 5/147; F04D 29/321; F04D 29/324; F04D 29/384; F04D 29/388; F05D 2240/301; F05D 2240/302; F05D 2240/30
See application file for complete search history.

(56) References Cited

U.S. PATENT DOCUMENTS

| | | | |
|---|---|---|---|
| 7,794,202 B2 * | 9/2010 | Borthwick | F01D 5/141 415/192 |
| 8,133,012 B2 * | 3/2012 | Nagai | F01D 5/141 415/149.1 |
| 8,147,207 B2 * | 4/2012 | Orosa | F04D 29/324 415/182.1 |

(Continued)

FOREIGN PATENT DOCUMENTS

| | | |
|---|---|---|
| JP | 2000-192824 A | 7/2000 |
| JP | 2008-115736 A | 5/2008 |
| JP | 2010-196563 A | 9/2010 |

OTHER PUBLICATIONS

Corresponding International Search Report with English Translation dated Nov. 9, 2010 (three (3) pages).

(Continued)

*Primary Examiner* — Ninh H Nguyen
(74) *Attorney, Agent, or Firm* — Crowell & Moring LLP

(57) ABSTRACT

The present invention provides a transonic blade that concurrently achieves reduction in shock loss at a design point and improvement in stall margin in blades operating in a flow field of transonic speed or higher in an axial-flow rotating machine. A cross-sectional surface at each of spanwise positions of the blade is shifted parallel to a stagger line connecting a leading edge with a trailing edge of the blade. A stacking line is shifted toward an upstream side of working fluid. The stacking line connects together respective gravity center positions of blade cross-sectional surfaces at spanwise positions in a range from a hub cross-sectional surface joined to a rotating shaft or an outer circumferential side casing of a rotating machine to a tip cross-sectional surface lying at a position most remote from the hub cross-sectional surface in a spanwise direction.

13 Claims, 10 Drawing Sheets

EMBODIMENT 1

(52) U.S. Cl.
CPC ...... *F05D 2210/30* (2013.01); *F05D 2240/301* (2013.01); *F05D 2240/302* (2013.01); *Y02T 50/673* (2013.01)

(56) References Cited

U.S. PATENT DOCUMENTS 8,167,567 B2 * 5/2012 Kirchner .................. F01D 5/12
　　　　　　　　　　　　　　　　　　　　　　416/223 R 2010/0068064 A1 　3/2010 　Nagai et al.
2010/0215503 A1 　8/2010 　Myoren et al.

OTHER PUBLICATIONS

Japanese-language Written Opinion dated Nov. 9, 2010 (PCT/ISA/237) (three (3) pages).

* cited by examiner

BASELINE BLADE

FIG. 5B

EMBODIMENT 1

TRANSONIC BLADE

TECHNICAL FIELD

The present invention relates to a transonic blade used in a flow field through which an overall or partial flow passes at a transonic speed or higher and to an axial-flow rotating machine using the transonic blade.

BACKGROUND ART

In the context of the recent increase in fuel cost, the importance of improved efficiency in axial-flow rotating machines has grown, such as industrial gas turbines and jet engines. One of means of improving efficiency in the axial-flow rotating machine is to reduce a blade loss. The blade loss is roughly classified into a profile loss occurring at a radial cross-sectional surface (airfoil) of a blade and the other losses. Examples of the other losses include a shock loss and a secondary loss. The recent axial-flow rotating machines subjected to a large load per one stage have an increased Mach number of working fluid flowing into a blade. Therefore, the shock loss tends to increase. In other words, a reduction in shock loss largely contributes to an improvement in performance of the rotating machine.

A technology (Water Atomization Cooling, WAC) has recently been studied in which fine droplets are sprayed to an air intake duct located at an inlet of a gas turbine compressor to cool intake air through the evaporation thereof for performance improvement. Incidentally, the technology relating to the WAC is described in e.g. patent document 1. The WAC is executed to lower the inlet temperature of the compressor; therefore, the overall gas turbine tends to increase a pressure ratio. Further, the evaporation resulting from the WAC causes a mixture gas of main flow air and water vapor. Since this mixture gas has lower acoustic velocity than air due to the presence of mixed water vapor, the Mach number increase which is the ratio of flow velocity to acoustic velocity. Thus, it is expected that shock loss at a transonic stage will increase.

Studies to reduce a shock loss have been made in the past. One of them is a study in which the shape of a stacking line is modified, with the stacking line being a line connecting together the gravity center positions of airfoil at respective spanwise positions. As shown in patent document 2, the following blade is proposed as a technology for modifying the shape of the stacking line. The cross-sectional surfaces in a range from a mean cross-sectional surface, which is an intermediate cross-sectional surface between a hub cross-sectional surface and a tip cross-sectional surface, to the hub cross-sectional surface and the tip cross-sectional surface are shifted toward the upstream side to form an S-shaped stacking line. In addition, the amount of shifting of the tip cross-sectional surface is maximized. Patent document 2 teaches that shifting the tip side toward the upstream can reduce various losses caused by shock waves. If the tip side is shifted toward the upstream side, there is a problem as below. A flow is earlier increased in velocity on the tip side to lower static pressure. A flow on the hub side moves toward the tip side to reduce the flow rate, which makes it easy to develop a boundary layer on the hub side. In patent document 2, the amount of downstream shift of the blade cross-sectional surfaces close to the mean cross-sectional surface is reduced, thereby suppressing an increase in loss resulting from the development of the boundary layer on the hub side.

PRIOR-ART DOCUMENTS

Patent Documents

Patent document 1: JP-2000-192824-A
Patent document 2: JP-2008-115736-A

SUMMARY OF THE INVENTION

Problem To Be Solved By the Invention

The transonic blade shown in patent document 2 satisfies both of a reduction in the loss induced by the shock wave at the tip cross-sectional surface and the suppression of the increased loss at the hub cross-sectional surface. Therefore, the transonic blade shown in patent document 2 can be expected to improve performance compared with that of the conventional transonic blade. Further, since separation at the hub cross-sectional surface is suppressed, a stall margin with respect to the flow field where the pressure ratio is increased can be increased. In the flow field where the pressure ratio is increased, a place where a large separation area induces stall is not always the hub cross-sectional surface. Therefore, an effect of increasing the stall margin is likely to be restrictive. Further, patent document 2 does not describe the details of the airfoil at spanwise positions; therefore if an appropriate airfoil is selected, further improved performance may be achieved.

It is an object of the present invention, therefore, to provide a transonic blade that increases a stall margin with respect to overall spanwise-directional positions, while achieving a reduction in shock loss.

Means for Solving the Problem

To achieve the above object, a transonic blade of the present invention used in a flow field through which an overall or partial flow passes at a transonic speed or higher is characterized by being formed such that a cross-sectional surface at each of spanwise positions of the blade is shifted parallel to a line connecting a leading edge with a trailing edge of the blade, a stacking line is shifted toward an upstream side of working fluid, the stacking line connecting together gravity center positions of blade cross-sectional surfaces at respective spanwise positions in a range from a hub cross-sectional surface joined to a rotating shaft or an outer circumferential side casing of a rotating machine to a tip cross-sectional surface lying at a position most remote from the hub cross-sectional surface in a spanwise direction, and a maximum thickness position of the cross-sectional surface of the blade at each of the spanwise positions is shifted toward a trailing edge side of the blade in the range from the hub cross-sectional surface to the tip cross-sectional surface.

A transonic blade used in a flow field through which an overall or partial flow passes at a transonic speed or higher is characterized by being formed such that a cross-sectional surface at each of spanwise positions of the blade is shifted parallel to a line connecting a leading edge with a trailing edge of the blade, a stacking line connecting together gravity center positions of the cross-sectional surfaces of the blade at respective spanwise positions has a constant axial position on a hub cross-sectional surface side of a certain spanwise position between a hub cross-sectional surface joined to a rotating shaft or an outer circumferential side casing of a rotating machine and a mean cross-sectional surface located at a center in a spanwise direction and is shifted toward the upstream side of working fluid in a range from the certain spanwise position to the tip cross-sectional surface side, and a maximum thickness position of the cross-sectional surface of the blade at each of the spanwise positions are shifted toward a trailing edge side of the blade in a range from the hub cross-sectional surface to the tip cross-sectional surface.

Effects of the Invention

The present invention can provide the transonic blade that can increase a stall margin with respect to an overall spanwise-directional position while reducing a loss resulting from a shock wave.

MODE FOR CARRYING OUT THE INVENTION

A transonic blade according to the present embodiment includes: a hub cross-sectional surface joined to a rotating shaft or an outer circumferential side casing of a rotating machine; a mean cross-sectional surface lying at a central position in a spanwise direction perpendicular to the rotating shaft; a tip cross-sectional surface lying at a position most remote from the hub cross-sectional surface in the spanwise direction; a leading edge located on an upstream side in a working-fluid flowing direction; and a trailing edge located on a downstream side in the working-fluid flowing direction. In addition, the transonic blade is such that an overall or partial flow passes the blade at a transonic velocity or higher. Further, the transonic blade is configured as below. Spanwise directional cross-sectional surfaces of the transonic blade are continuously shifted parallel to a direction connecting the leading edge with the trailing edge. Axial positions of a stacking line connecting together the respective gravity center positions of the hub cross-sectional surface, the mean cross-sectional surface and the tip cross-sectional surface are shaped so as to be reduced as the spanwise-directional positions are increased. Maximum thickness axial positions at the respective spanwise directional cross-sectional surfaces forming the transonic blade are increased as the spanwise-directional positions are increased.

Alternatively, a transonic blade includes: a hub cross-sectional surface joined to a rotating shaft or an outer circumferential side casing of a rotating machine; a mean cross-sectional surface lying at a central position in a spanwise direction perpendicular to the rotating shaft; a tip cross-sectional surface lying at a position most remote from the hub cross-sectional surface in the spanwise direction; a leading edge located on an upstream side in a flow direction; and a trailing edge located on a downstream side in the flow direction. In addition, the transonic blade is such that an overall or partial flow passes the blade at a transonic velocity or higher. Further, the transonic blade is configured as below. Spanwise directional cross-sectional surfaces of the transonic blade are continuously shifted parallel to a direction connecting the leading edge with the trailing edge. Axial positions of a stacking line connecting together the respective gravity center positions of the hub cross-sectional surface, the mean cross-sectional surface and the tip cross-sectional surface are shaped such that they are constant up to a certain spanwise position between the hub cross-sectional surface and the mean cross-sectional surface and they are reduced as spanwise directional positions are increased in a range from the spanwise position to the tip cross-sectional surface. Maximum thickness axial positions at respective spanwise directional cross-sectional surfaces forming the transonic blade are increased as the spanwise directional positions are increased.

Incidentally, it is preferable that a cross-sectional shape of the transonic blade in a spanwise direction be formed of a circular arc forming the leading edge portion, a circular arc forming the trailing edge portion, an upper surface of the blade and a lower surface of the blade. In addition, it is preferable that the transonic blade is a multi circular arc blade formed such that a shape of a camber line defined by a midpoint between the upper and lower surfaces of the blade is formed of two or more circular arcs. In the present embodiment, it is preferable that the maximum thickness position lie on the upstream side of an average axial position between the leading edge and the trailing edge at the hub cross-sectional surface and on the downstream side of the average axial position between the leading edge and the trailing edge at the tip cross-sectional surface.

Further, an axial-flow rotating machine includes a rotating shaft, a plurality of rotor blades mounted on the outer circumferential surface of the rotating shaft in axial and circumferential directions of the rotating shaft at regular intervals, a casing covering the rotating shaft and the rotor blades, and a plurality of stator blades extending from the surface of the casing in the direction of the rotating shaft and each arranged between the corresponding rotor blades. The axial-rotating machine uses any one of the transonic blades described above as all or part of the rotor blades or the stator blades.

Embodiments of the present invention will hereinafter be described in detail with reference to the drawings.

Embodiment 1

Figure 1:
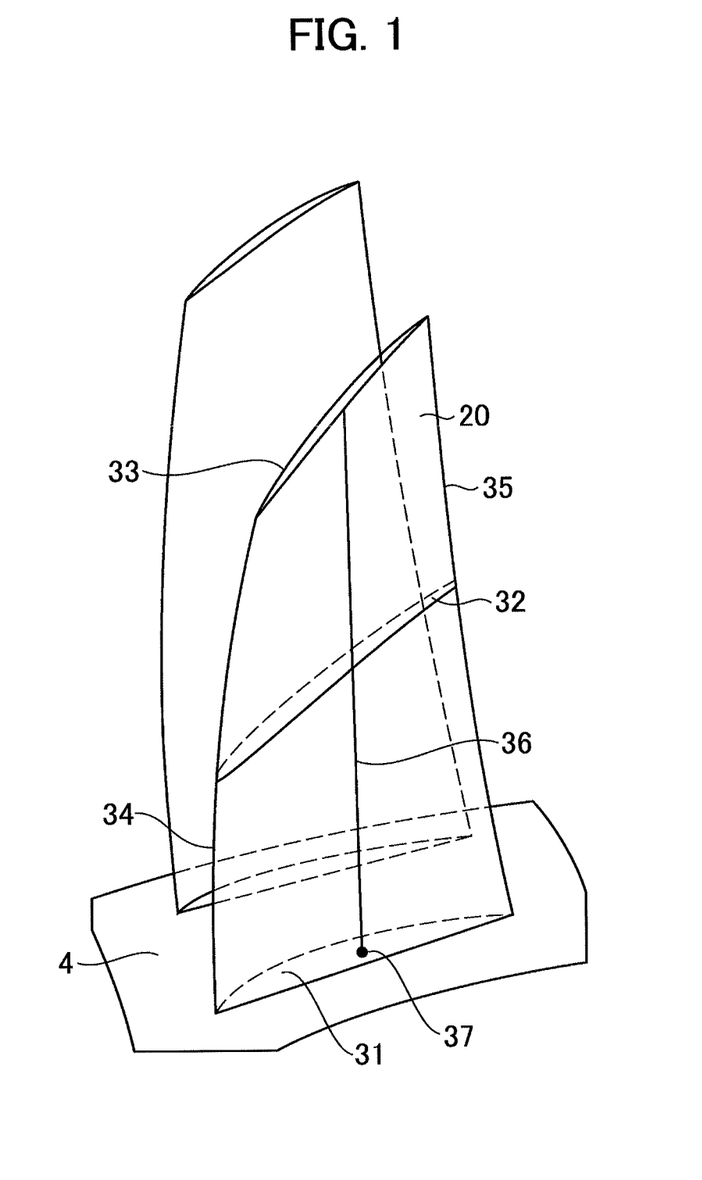
FIG. 1 is a perspective view of a transonic blade according a first embodiment of the present invention.
Figure 2:
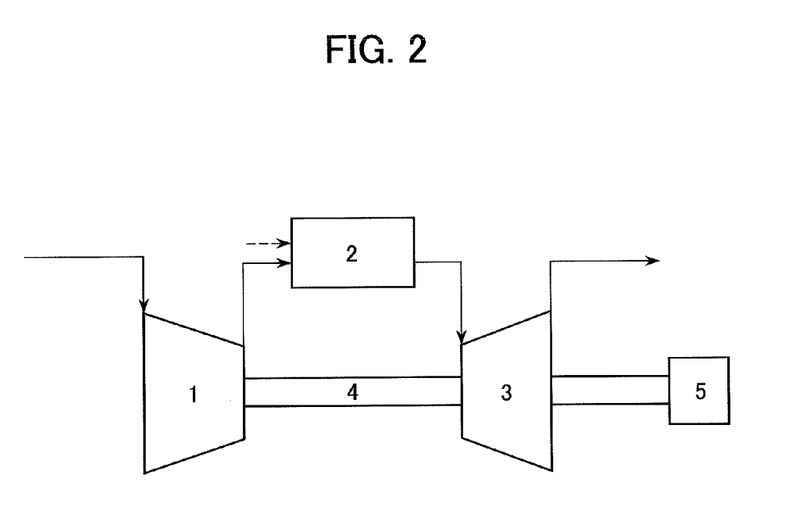
FIG. 2 is a cycle configuration diagram of an axial-flow rotating machine incorporating the first embodiment of the present invention.

FIG. 1 is a perspective view of transonic blades according to a first embodiment. FIG. 2 is a cycle configuration diagram of an axial-flow rotating machine into which the transonic blades are built. Incidentally, a gas turbine compressor is here assumed as the axial-flow rotating machine.

An outline of a cycle is first described with reference to FIG. 2. Working fluid first flows into an axial-flow compressor 1 and compressed therein. The working fluid thus compressed flows into a combustor 2, into which fuel is injected to produce high-temperature combustion gas. The high temperature and pressure combustion gas flows into a turbine 3 to rotate a rotor 4, thereby driving a generator 5 for electrical generation.

Figure 3:
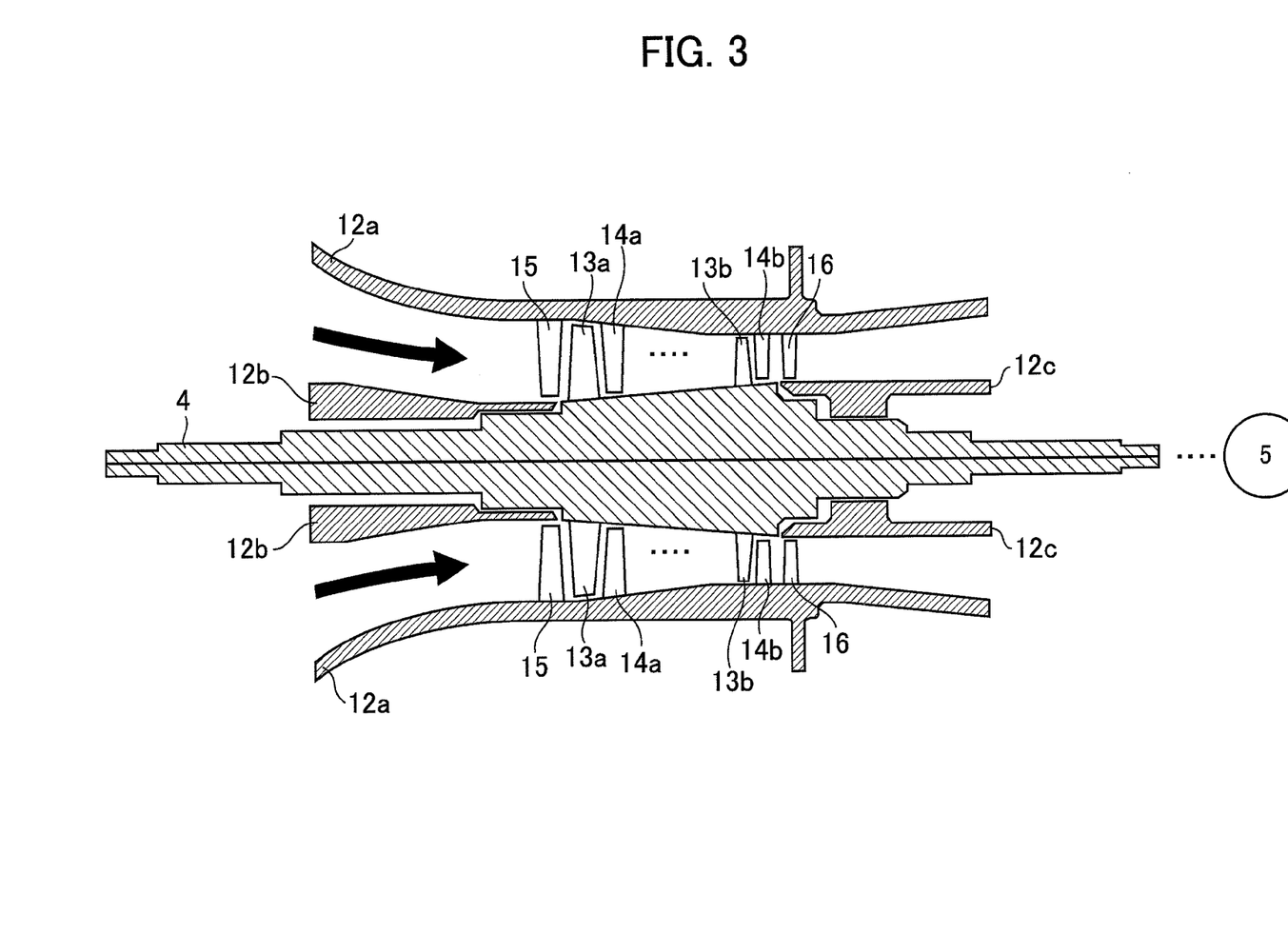
FIG. 3 is a cross-sectional view of the axial-flow compressor according to the first embodiment of the present invention, taken along a meridional plane.

FIG. 3 is a cross-sectional view of the axial-flow compressor 1 taken along a meridional plane. Referring to FIG. 3, the compressor 1 includes a rotor 4 or a rotating shaft; an outer circumferential side casing 12a; an inlet inner circumferential side casing 12b; an outlet inner circumferential side casing 12c; rotor blades 13; stator blades 14; an inlet guide blade 15; and an Exit guide vane 16. The axial-flow compressor 1 is such that the rotor blade 13 and the stator blade 14 form a stage. A plurality of the rotor blades and stator blades are arranged alternately in the axial direction. In this case, working fluid passes between the outer circumferential side of the rotor 4 and the casing 12, passing through the rotor blades 13a and 13b joined to the outer circumferential side of the rotor 4, the stator blades 14a and 14b joined to the casing 12, the inlet guide blade 15 and the Exit guide vane 16, thereby being compressed. Incidentally, the above-mentioned compressor front-stage side rotor blade 13a is assumed as the transonic blade 20 in the present embodiment; however, it is no problem to assume the other rotor blades or the stator blade as the transonic blade 20.

A description is next given of the configuration of the transonic blade 20 of the present embodiment with reference to FIG. 1. Referring to FIG. 1, the transonic blade 20 is formed of cross-sectional surfaces (airfoils), continued in the radial direction of the rotor 4, and including a hub cross-sectional surface 31, a mean cross-sectional surface 32, and a tip cross-sectional surface 33. The hub cross-sectional surface 31 connects with the outer circumferential side of the rotor 4. The mean cross-sectional surface 32 is a cross-sectional surface located at a position half of a span in the vertical direction (the spanwise direction) from the rotational direction of the rotor 4 toward the casing 12. The tip cross-sectional surface 33 is a cross-sectional surface most remote from the hub cross-sectional surface 31 in the spanwise direction. In the airfoil, a point located on the most upstream side corresponds to a leading edge 34 and a point located on the most downstream side corresponds to a trailing edge 35. A line connecting together the gravity center positions of the airfoils at the respective spanwise positions is referred to as a stacking line 36 and the gravity center position of the hub cross-sectional surface 31 is referred to as a stacking center 37. Incidentally, a multi circular arc is assumed as the cross-sectional shape of each airfoil. A multi circular arc blade is a blade formed of circular arcs of the leading edge portion and the trailing edge portion, and the upper and lower surfaces thereof. The multi circular arc blade is characterized in that a camber line defined as a midpoint of the upper and lower surfaces of the blade is formed of two or more circular arcs. Incidentally, if the transonic blade 20 described above is applied to the stator blade 14, the hub cross-sectional surface 31 is located on the casing 12 side and the tip cross-sectional surface 33 on the rotor 4 side.

Figure 4:
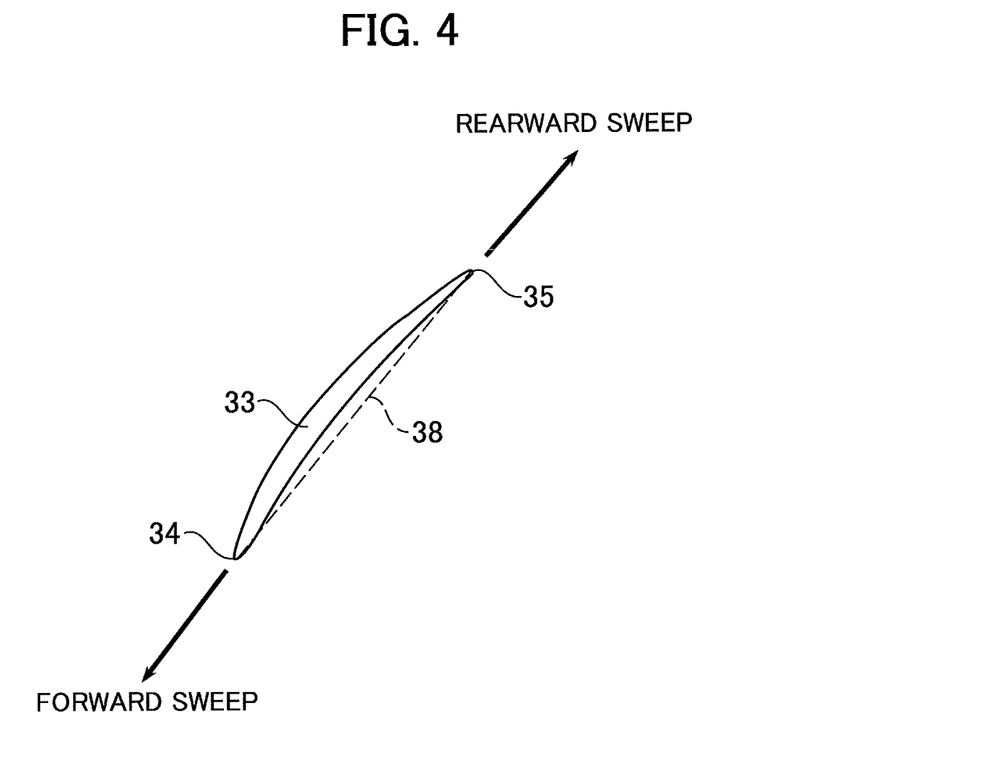
FIG. 4 is an enlarged view of a tip cross-sectional surface of the transonic blade according to the first embodiment of the present invention.

A method of modifying the stacking line 36 is next described with reference to FIG. 4, which is an enlarged diagram of the tip cross-sectional surface. Referring to FIG. 4, a straight line connecting the leading edge 34 with the trailing edge 35 is referred to as a stagger line 38. The stacking line 36 is modified by being shifted in a direction along the stagger line 38. As regards the shifting direction, shifting from the stacking center 37 toward the upstream side is defined as forward sweep and shifting toward the downstream side as backward sweep. The stacking line 36 of the transonic blade 20 of the present embodiment is subjected to the forward sweep at all the spanwise positions and is assumed to have such a shape that the amount of the forward sweep is monotonously increased with the increased span.

Figure 5A:
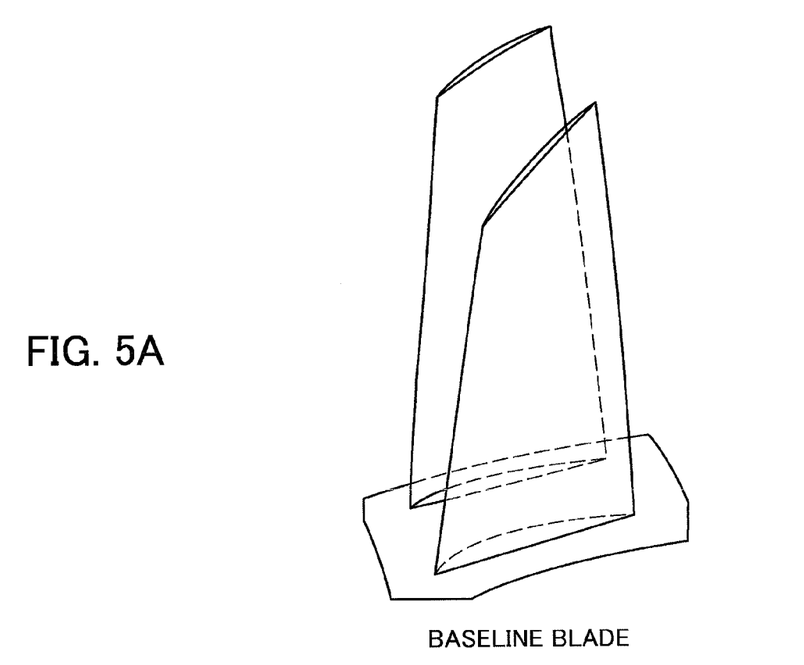
FIG. 5A is a view of a baseline blade.
Figure 5B:
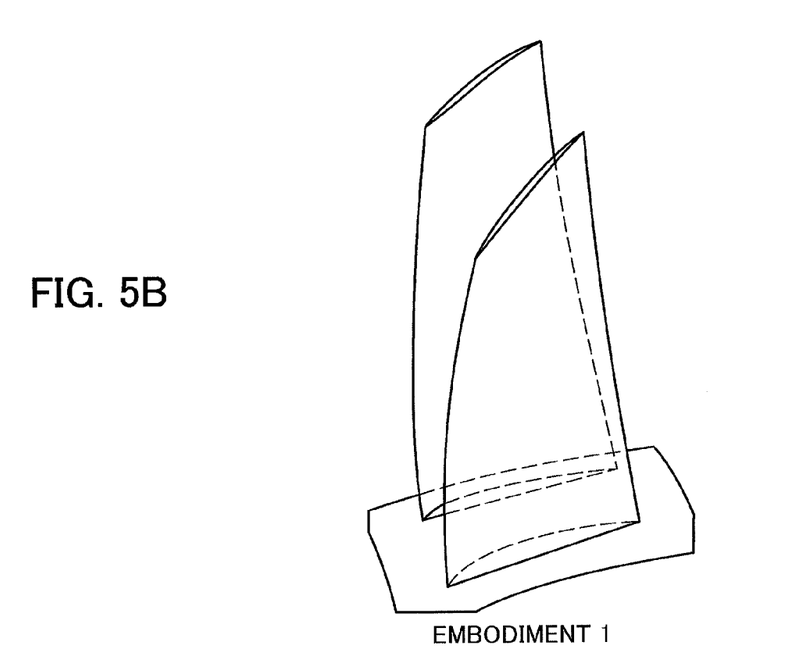
FIG. 5B is a view of the transonic blade according to the first embodiment of the present invention.

A description is next given of conditions of a flow field on the transonic blade 20 according to the present embodiment. The compressor 1 is assumed to have a pressure ratio of about 25. In addition, the transonic blade 20 is assumed to be used as a rotor blade for an initial stage. The transonic blade 20 is assumed to have specifications: a pressure ratio of about 1.35 and a relative inflow Mach number of about 1.2 at its end. In this case, a blade (hereinafter defined as the baseline blade) that has a stacking line without sweep and constant maximum-thickness positions at respective spans is considered as a target for comparison in the performance of the transonic blade 20. Both the transonic blade 20 and the baseline blade are expected to cause a shock wave on the suction surface of the blade in a range from the mean cross-sectional surface 32 to the tip cross-sectional surface 33, which causes a loss. Incidentally, the comparison in airfoil between the baseline blade and the transonic blade 20 is as shown in FIGS. 5A and 5B.

Figure 6:
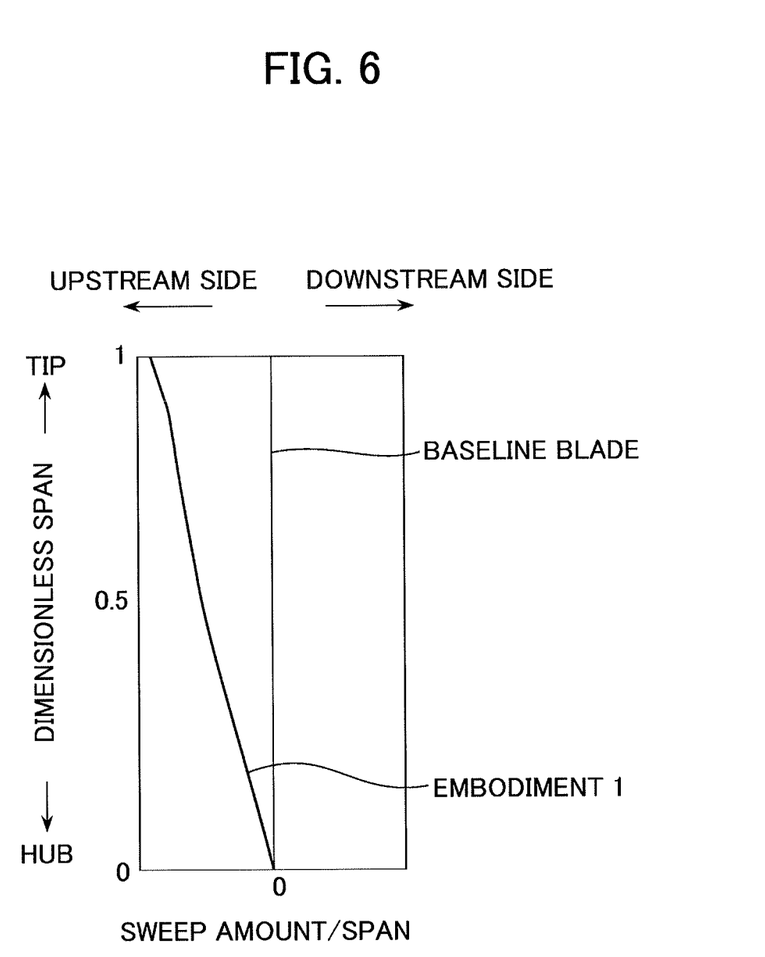
FIG. 6 is a diagram for comparison in stacking line between the transonic blade according to the first embodiment of the present invention and the baseline blade.
Figure 7:
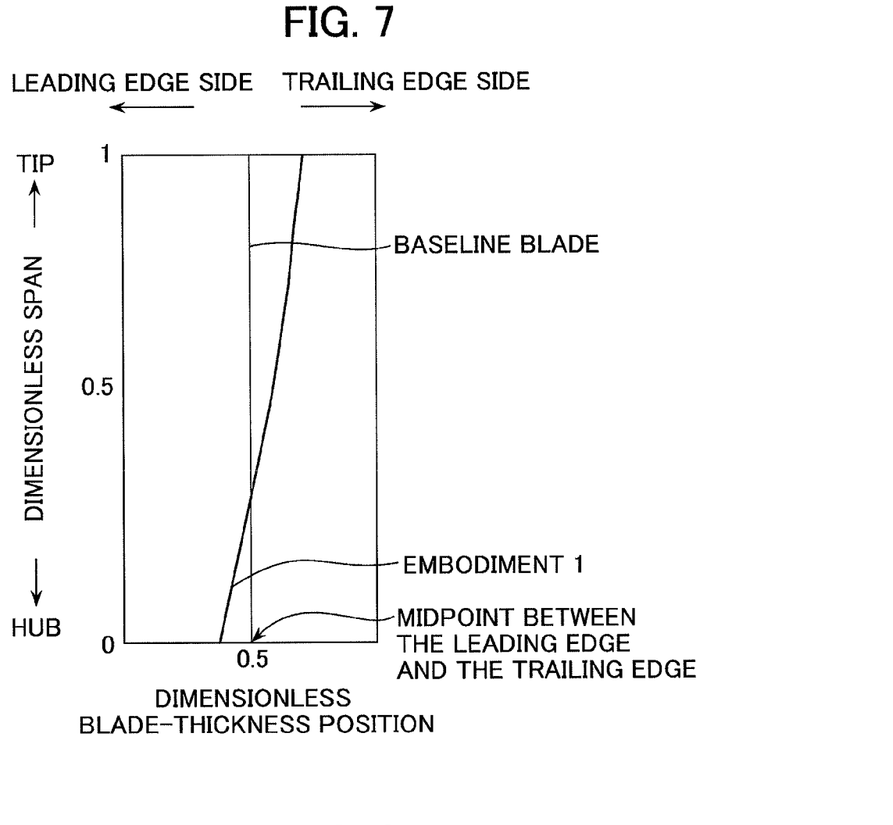
FIG. 7 is a diagram for comparison between the transonic blade according to the first embodiment of the present invention and the baseline blade in the spanwise-directional distribution of a maximum blade thickness position.
Figure 8:
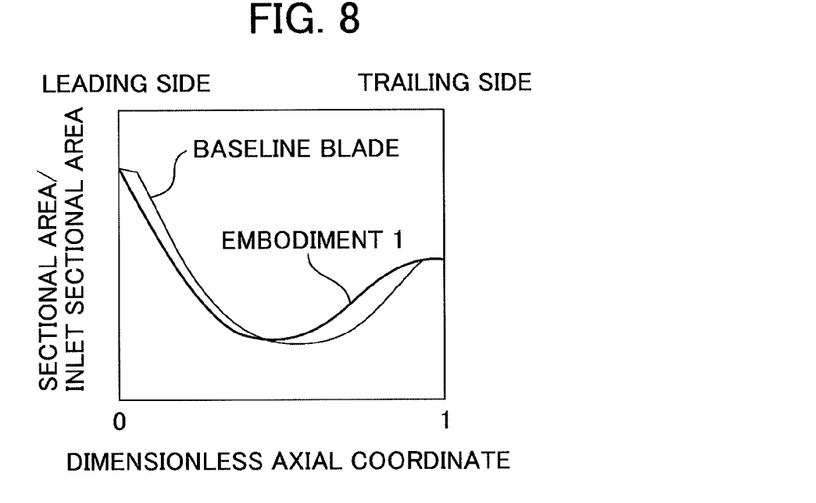
FIG. 8 is a diagram for comparison between the transonic blade according to the first embodiment of the present invention and the baseline blade in an axial cross-sectional area distribution.

Characteristics of aerodynamic performance of the transonic blade 20 according to the present embodiment are described through a comparison in shape with the baseline blade. FIG. 6 shows a comparison of the stacking line. FIG. 7 shows a comparison of a spanwise direction distribution of maximum blade thickness positions. FIG. 8 shows a comparison of an axial cross-sectional distribution. The horizontal axis in FIG. 6 represents an amount of sweep, which is made dimensionless by span. The horizontal axis in FIG. 7 represents a value obtained by making the blade-maximum-thickness position dimensionless by a distance (chord length) between the leading edge and the trailing edge. If such a value is 0.5, it is placed at the midpoint between the leading edge and the trailing edge. Further, the horizontal axis in FIG. 8 represents an axial position in the case where the leading edge position of the hub cross-sectional surface 31 is set at 0 and the trailing edge position at 1.

Figure 9:
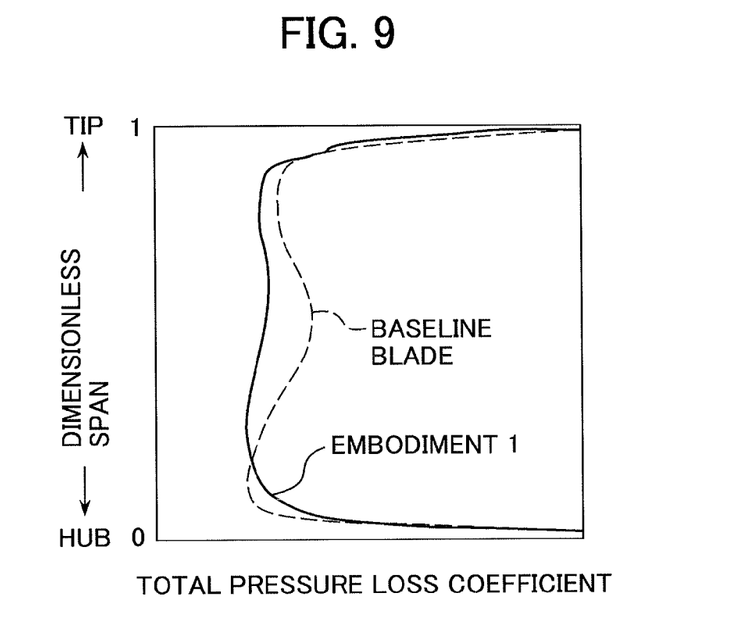
FIG. 9 is a diagram for comparison between the transonic blade according to the first embodiment of the present invention and the baseline blade in a spanwise-directional loss distribution.
Figure 10:
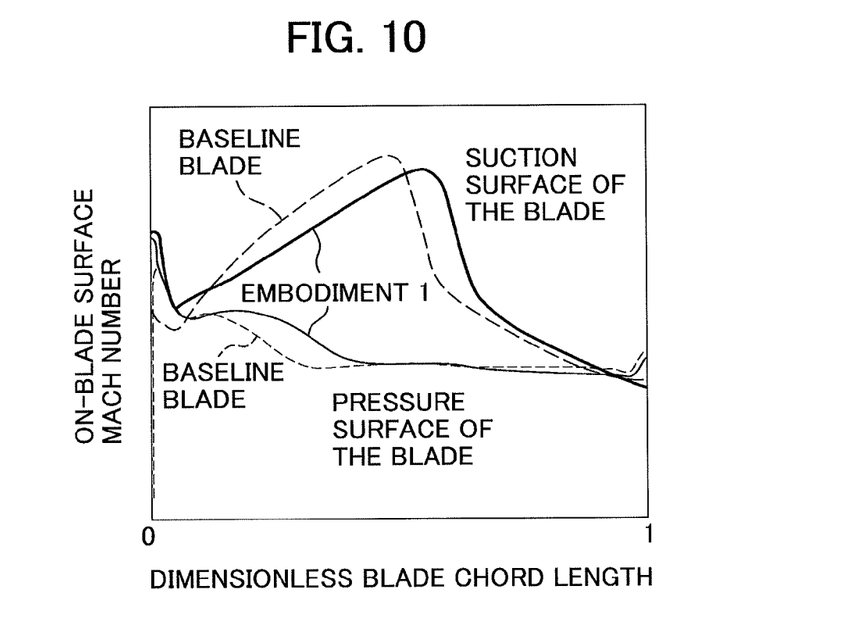
FIG. 10 is a diagram for comparison between the transonic blade according to the first embodiment of the present invention and the baseline blade in on-blade-surface Mach number distribution.

Referring to FIGS. 6 and 8, the transonic blade 20 of the present embodiment has the stacking line shifted toward the upstream side in a range from the hub to the tip compared with that of the baseline blade. Therefore, the transonic blade 20 tends to alleviate the axial variation of a cross-sectional area. Thus, a variation in flow rate at the cross-section of the blade is alleviated, which makes it possible to reduce a shock loss. Further referring to FIG. 7, the transonic blade 20 has the maximum thickness position shifted toward the downstream side, compared with that of the baseline blade, at such a range between the mean cross-sectional surface 32 and the tip cross-sectional surface 33 where a relatively strong shock wave occurs. In general, considering a two-dimensional flow at a certain spanwise position, a shock wave occurs at the maximum thickness position where a gas-path width between blades is a minimum. However, there is a tendency that as smaller the change rate of the gas-path width is, the weaker the shock wave is. In the present embodiment, the maximum blade-thickness position in a range from the mean cross-sectional surface 32 to the tip cross-sectional surface 33 lies on the downstream side. Therefore, it is expected that the shock wave at the maximum thickness position weakens to reduce a loss. A comparison in the loss in the spanwise direction between the transonic blade 20 and the baseline blade is here shown in FIG. 9. In addition, a comparison of an on-blade-surface Mach number distribution at the cross-section in a range from the mean cross-sectional surface 32 to the tip cross-sectional surface 33 is shown in FIG. 10. As shown in FIGS. 9 and 10, the transonic blade 20 alleviates a variation in the axial cross-sectional area distribution of the overall blade and a variation in the gas-path width in a range from the mean cross-sectional surface 32 to the tip cross-sectional surface 33. This can reduce the peak Mach number compared with the baseline blade, thereby achieving a reduction in the shock loss at a design point.

Figure 11A:
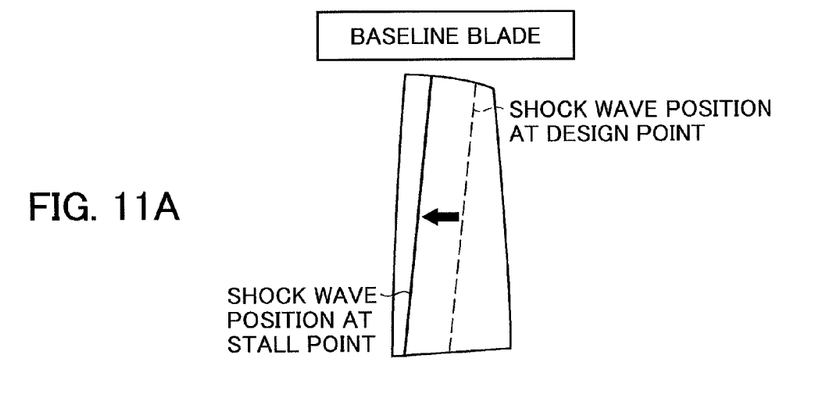
FIG. 11A is a schematic view of shock wave position on the baseline blade.
Figure 11B:
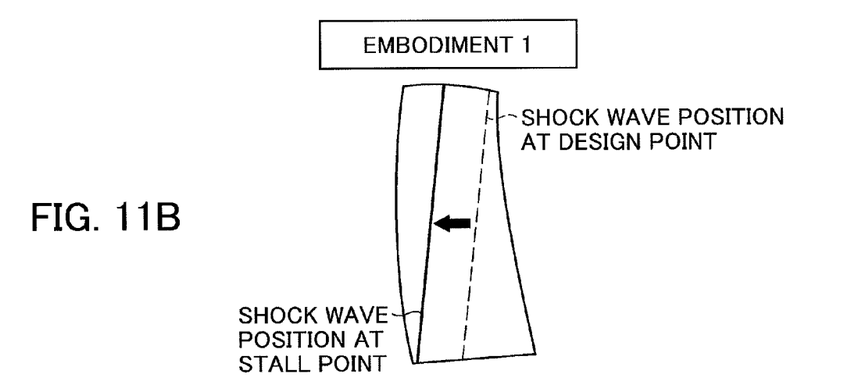
FIG. 11B is a schematic view of shock wave position on the transonic blade according to the first embodiment of the present invention.
Figure 11C:
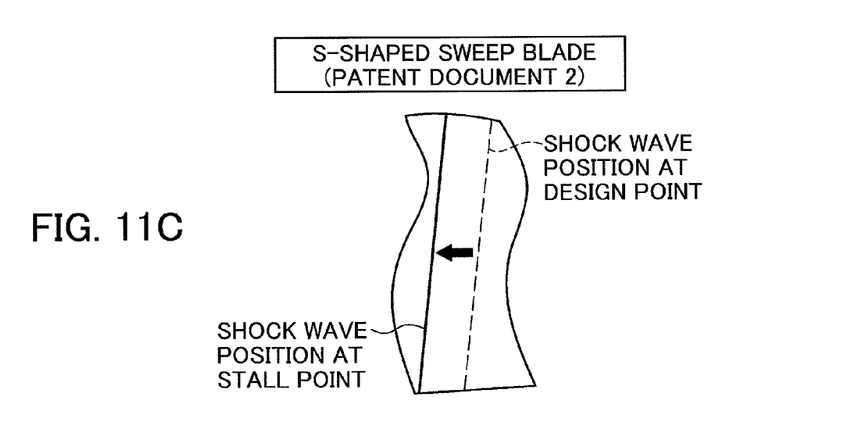
FIG. 11C is a schematic view of shock wave position on an S-shaped sweep blade.

The transonic blade 20 of the present embodiment improves not only the performance of the design point but also the stall margin encountered when a pressure ratio is increased. How that happens is explained using FIGS. 11A to 11C. FIGS. 11A to 11C include schematic views showing shock wave positions on the suction surface side at a design point and a stall point. In FIGS. 11A to 11C, the stall point has a pressure ratio greater than that of the design point; therefore, the shock wave position of the stall point relatively shifts toward the upstream side. If the shock wave reaches the vicinity of the leading edge, a flow separates due to the interference with the boundary layer, leading to a stall. To improve the stall margin, it is preferable, therefore, that the shock wave position at the design point lie on the downstream side and the shock wave at the design point be weak. The transonic blade 20 of the present embodiment has the stacking line shifted toward the upstream side with respect to the baseline blade and the maximum thickness position shifted toward the downstream side. Therefore, it is possible to weaken the shock wave at the design point and at the same time to shift the shock wave position toward the downstream side.

To improve the stall margin, it is desirable not only to shift the above-mentioned shock wave position toward the downstream side but also to make it possible to improve the characteristics in the vicinity of the hub cross-sectional surface 31. The reason is because of the following. Since the inlet Mach number in the vicinity of the hub cross-sectional surface 31 is smaller than that on the tip cross-sectional surface 33, it is probable that increase in the inlet flow angle on the suction surface side of the blade in the vicinity of the leading edge causes the separation of the flow, not that the shock wave reaches the leading edge portion to cause the separation of the flow. The transonic blade 20 of the present embodiment is such that the maximum blade-thickness position in the vicinity of the hub cross-sectional surface 31 lies on the upstream side with respect to the baseline blade. Therefore, the thickness in the vicinity of the leading edge of the blade tends to increase. As the increase in the thickness increases the curvature radius of the blade surface in the vicinity of the leading edge on the suction surface side, it is thought that the increase in the thickness produces an effect of suppressing the above-mentioned separation.

On the other hand, the S-shaped sweep blade as disclosed in patent document 2 has the amount of sweep of the stacking line toward the upstream side, which is not monotonously increased with respect to the spanwise direction. Therefore, the S-shaped sweep blade has a place where the amount of sweep in a range from the mean cross-sectional surface 32 to the tip cross-sectional surface 33 is smaller than that in a range from the hub cross-sectional surface 31 to the mean cross-sectional surface 32. On the other hand, positions where the shock waves occur depend on the three-dimensional gas-path shape formed by the blade rows; therefore, it is expected that such positions do not follow the shape of the stacking line but form into a shape similar to a straight line. As shown in FIG. 11C, therefore, there are places where the shock wave positions at the design point relatively shift toward the upstream side in a range from the mean cross-sectional surface 32 to the tip cross-sectional surface 33. In this case, if the pressure ratio increases to shift a point of operation toward the stall side, it is much likely that the shock wave position reaches the leading edge at a pressure ratio lower than that of the first embodiment. In short, it is considered that the stall margin is smaller than that of the first embodiment.

The following is a summary of the above description. The transonic blade 20 of the present embodiment can improve the stall margin when the pressure ratio is increased, while reducing the shock loss at the design point in a range from the mean cross-sectional surface 32 to the tip cross-sectional surface 33 compared with the non-swept blade. In addition, the transonic blade 20 of the present embodiment improves the stall margin compared with the S-shaped sweep blade in patent document 2 because of the following. The stacking line is monotonously shifted toward the upstream side and the maximum thickness position of the blade is shifted toward the downstream side in a range from the mean cross-sectional surface 32 to the tip cross-sectional surface 33 and toward the upstream side in the vicinity of the hub cross-sectional surface 31.

According to the present embodiment, the stacking line is shifted toward the upstream side; therefore, the position where the shock wave occurs at the design pressure ratio can relatively be shifted toward the downstream side. Thus, the stall margin encountered when the shock wave is shifted toward the upstream side due to the increased pressure ratio is improved. The maximum thickness position of the airfoil is located on the downstream side along with the increased span. Therefore, the variation of the gas-path width on the tip side (on the large span side) where the strong shock wave occurs becomes moderate. Also the position where the shock wave occurs shifts toward the downstream side; therefore, it is possible to satisfy both of a reduction in the shock loss at the design point and an improvement in stall margin.

Embodiment 2

Figure 12A:
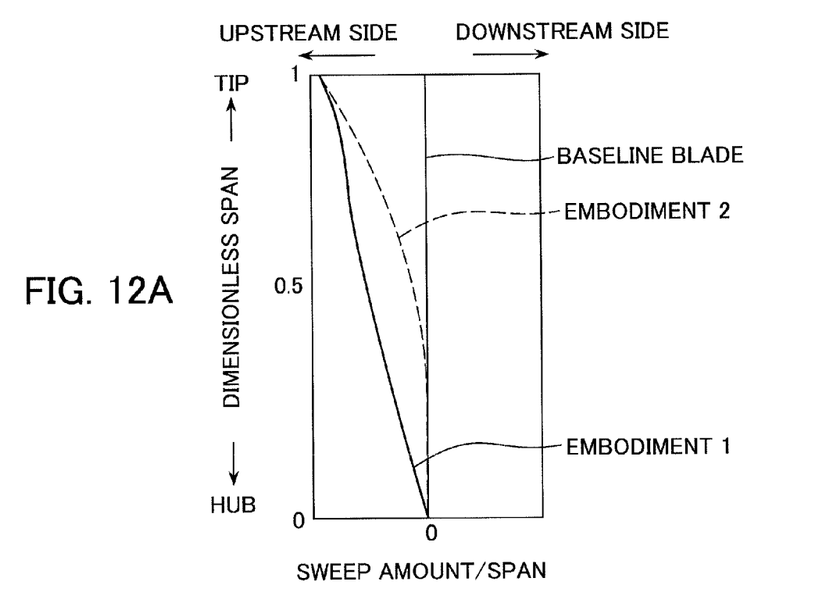
FIG. 12A is a diagram for comparison in stacking line between a transonic blade according to a second embodiment of the present invention and the baseline blade, and between the transonic blade according to the first embodiment of the present invention and the baseline blade.
Figure 12B:
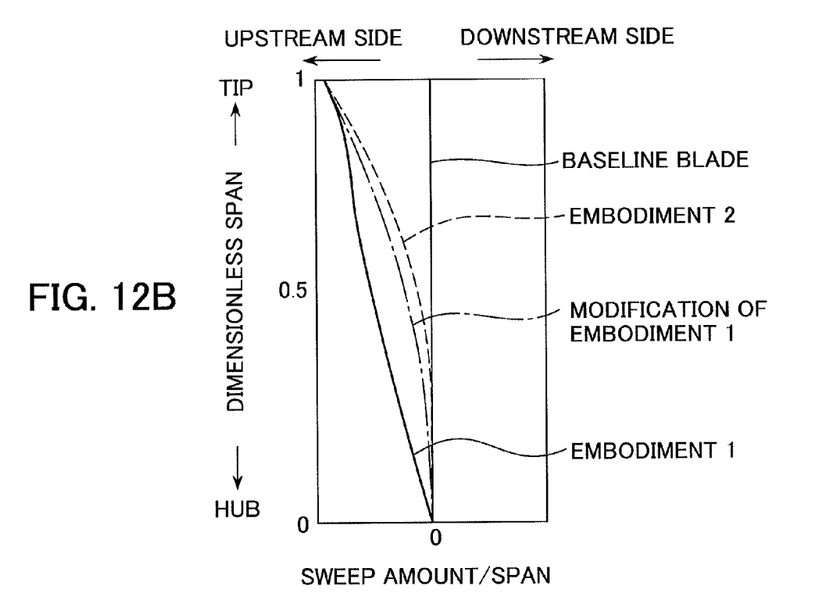
FIG. 12B is a diagram for comparison in stacking line between a transonic blade according to a second embodiment of the present invention and the baseline blade, and between the transonic blade according to the first embodiment of the present invention and that of a modification.

A comparison of the stacking line of a transonic blade according to a second embodiment is shown in FIG. 12. The second embodiment is different from the first embodiment in that the axial position of the stacking line is constant on the hub cross-sectional surface 31 side of a certain spanwise position lying between the hub cross-sectional surface 31 and the mean cross-sectional surface 32 and is monotonously reduced on the tip cross-sectional surface 33 side of such a certain spanwise position. The airfoil of the second embodiment is the same as that of the first embodiment. Incidentally, devices overlapping with those in FIG. 6 are denoted by like reference numerals and their detailed explanations are omitted.

The transonic blade 20 of the present embodiment has the axial position of the stacking line that does not vary up to a certain spanwise position. Therefore, the axial position in a range from the mean cross-sectional surface 32 to the tip cross-sectional surface 33 shifts toward the downstream side compared with the transonic blade of the first embodiment. Thus, it is believed that the axial position of the blade gravity center comes close to the stacking center 37 compared with that of the transonic blade of the first embodiment.

In general, local stress occurring in the transonic blade is much likely to be maximized in the vicinity of the leading edge of the hub cross-sectional surface 31. In addition, the local stress tends to be reduced as the gravity center position of the overall blade is closer to the stacking center 37. In short, it is believed that the local stress of the blade of the present embodiment is more reduced than that of the first embodiment, so that reliability is improved.

On the other hand, the airfoil of the present embodiment is the same as that of the first embodiment. It is expected, therefore, that the shock wave position is shifted toward the downstream side in a range from the mean cross-sectional surface 32 to the tip cross-sectional surface 33 at the design point and the blade-thickness in the vicinity of the hub cross-sectional surface 31 is increased. Further, unlike in patent document 2, there is no place where the amount of sweep in a range from the mean cross-sectional surface 32 to the tip cross-sectional surface 33 is smaller than that in a range from the hub cross-sectional surface 31 to the mean cross-sectional surface 32. Therefore, it is expected that the stall margin is substantially equal to that of the first embodiment. However, the amount of sweep is small as a whole compared with that in the first embodiment. The effect of alleviating the variation of an axial cross-sectional area is reduced. Thus, an effect of improving design point performance compared with that of the baseline blade is smaller than that of the first embodiment.

For the stacking line of the blade of the first embodiment, if the change rate in the amount of sweep at the hub cross-sectional surface 31 is substantially equal to 0 and the change rate in the amount of sweep at the tip cross-sectional surface 33 is maximized, the stacking line is shaped as in FIG. 13. Thus, the blade as below can be provided. An improvement rate of the design point performance is low similarly to the present embodiment; however, an increase in local stress is suppressed while improving the stall margin.

The following is a summary of the above description. While ensuring the stall margin roughly equal to that of the first embodiment, the present embodiment can reduce the local stress in the vicinity of the leading edge of the hub cross-sectional surface by bringing the gravity center position of the blade closer to the stacking center 37 compared with that of the first embodiment. Thus, the reliability of the blade can be improved.

INDUSTRIAL APPLICABILITY

The present invention can be applied to a blade that has, as an operating condition, a flow field of transonic speed or higher at which a shock wave occurs between blades. The use applications of the transonic blade of the present invention include an axial-flow rotating machine such as a gas turbine or an aviation engine.

EXPLANATION OF REFERENCE NUMERALS

1 Compressor
2 Combustor
3 Turbine
4 Rotor
5 Generator
12a, 12b, 12c Casing
13a, 13b Rotor blade
14a, 14b Stator blade
15 Inlet guide blade
16 Exit guide vane
20 Transonic blade
31 Hub cross-sectional surface
32 Mean cross-sectional surface
33 Tip cross-sectional surface
34 Leading edge
35 Trailing edge
36 Stacking line
37 Stacking center
38 Stagger line

The invention claimed is:

1. A transonic blade used in a flow field through which an overall or partial flow passes at a transonic speed or higher, wherein the transonic blade is formed such that:
   a cross-sectional surface at each of spanwise positions of the blade is shifted parallel to a line connecting a leading edge with a trailing edge of the blade;
   a stacking line is shifted toward an upstream side of working fluid, the stacking line connecting together gravity center positions of blade cross-sectional surfaces at respective spanwise positions in a range from a hub cross-sectional surface joined to a rotating shaft or an outer circumferential side casing of a rotating machine to a tip cross-sectional surface lying at a position most remote from the hub cross-sectional surface in a spanwise direction; and
   a maximum thickness position of the cross-sectional surface of the blade at each of the spanwise positions are shifted toward a trailing edge side of the blade in a range from the hub cross-sectional surface to the tip cross-sectional surface.

2. The transonic blade according to claim 1, wherein the stacking line is located on the upstream side of the working fluid at all spanwise positions and is monotonously shifted toward the upstream side from the hub cross-sectional surface to the tip cross-sectional surface.

3. The transonic blade according to claim 1, wherein the maximum blade-thickness position is located on a leading edge side at the hub cross-sectional surface and is monotonously shifted toward a trailing edge side in a range from the hub cross-sectional surface to the tip cross-sectional surface.

4. The transonic blade according to claim 1, wherein the maximum blade-thickness position lies on the upstream side of an average axial position between the leading edge and the trailing edge at the hub cross-sectional surface and lies on the downstream side of an average axial position between the leading edge and the trailing edge at the tip cross-sectional surface.

5. The transonic blade according to claim 1, wherein a cross-sectional shape at each of the spanwise positions is formed of a circular arc forming a leading edge portion of the blade, a circular arc forming a trailing edge portion, an upper surface of the blade and a lower surface of the blade, and a shape of a camber line defined by a midpoint between the upper and lower surfaces of the blade is a multi circular arc formed of two or more circular arcs.

6. The transonic blade according to claim 1,
wherein a change rate of the stacking line toward the upstream side is maximized at the tip cross-sectional surface.

7. A axial-flow rotating machine comprising:
a plurality of stator blades mounted in axial and circumferential directions on the inner circumferential surface side of a casing; and
a plurality of rotor blades mounted in the circumferential direction on an outer circumferential surface side of a rotating shaft;
wherein the transonic blade of claim 1 is used for all or part of the stator blades.

8. A transonic blade used in a flow field through which an overall or partial flow passes at a transonic speed or higher, wherein the transonic blade is formed such that:
a cross-sectional surface at each of spanwise positions of the blade is shifted parallel to a line connecting a leading edge with a trailing edge of the blade;
a stacking line connecting together gravity center positions of the cross-sectional surfaces of the blade at respective spanwise positions has a constant axial position on a hub cross-sectional surface side of a certain spanwise position between a hub cross-sectional surface joined to a rotating shaft or an outer circumferential side casing of a rotating machine and a mean cross-sectional surface located at a center in a spanwise direction and is shifted toward the upstream side of working fluid from the certain spanwise position to the tip cross-sectional surface side; and
a maximum thickness position of the cross-sectional surface of the blade at each of the spanwise positions is shifted toward a trailing edge side of the blade in a range from the hub cross-sectional surface to the tip cross-sectional surface.

9. The transonic blade according to claim 8,
wherein the maximum blade-thickness position is located on a leading edge side at the hub cross-sectional surface and is monotonously shifted toward a trailing edge side in a range from the hub cross-sectional surface to the tip cross-sectional surface.

10. The transonic blade according to claim 8,
wherein the maximum blade-thickness position lies on the upstream side of an average axial position between the leading edge and the trailing edge at the hub cross-sectional surface and lies on the downstream side of an average axial position between the leading edge and the trailing edge at the tip cross-sectional surface.

11. The transonic blade according to claim 8,
wherein a cross-sectional shape at each of the spanwise positions is formed of a circular arc forming a leading edge portion of the blade, a circular arc forming a trailing edge portion, an upper surface of the blade and a lower surface of the blade, and a shape of a camber line defined by a midpoint between the upper and lower surfaces of the blade is a multi circular arc formed of two or more circular arcs.

12. The transonic blade according to claim 8,
wherein a change rate of the stacking line toward the upstream side is maximized at the tip cross-sectional surface.

13. A axial-flow rotating machine comprising:
a plurality of stator blades mounted in axial and circumferential directions on the inner circumferential surface side of a casing; and
a plurality of rotor blades mounted in the circumferential direction on an outer circumferential surface side of a rotating shaft;
wherein the transonic blade of claim 8 is used for all or part of the stator blades.

* * * * *